(12) United States Patent
Wen et al.

(10) Patent No.: US 12,538,362 B2
(45) Date of Patent: Jan. 27, 2026

(54) RANDOM ACCESS METHOD, APPARATUS, AND SYSTEM

(71) Applicant: Huawei Technologies Co., Ltd., Shenzhen (CN)

(72) Inventors: Ronghui Wen, Beijing (CN); Zheng Yu, Beijing (CN); Xiangdong Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 423 days.

(21) Appl. No.: 18/061,087

(22) Filed: Dec. 2, 2022

(65) Prior Publication Data

US 2023/0096371 A1    Mar. 30, 2023

Related U.S. Application Data

(63) Continuation of application No. PCT/CN2021/096096, filed on May 26, 2021.

(30) Foreign Application Priority Data

Jun. 4, 2020 (CN) .................... 202010498461.1

(51) Int. Cl.
*H04W 74/08* (2024.01)
*H04W 72/1273* (2023.01)
(Continued)

(52) U.S. Cl.
CPC ... *H04W 74/0841* (2013.01); *H04W 72/1273* (2013.01); *H04W 72/23* (2023.01); *H04W 74/006* (2013.01); *H04W 74/0833* (2013.01)

(58) Field of Classification Search
CPC ........... H04W 74/0841; H04W 74/006; H04W 74/0833; H04W 72/23; H04W 72/1273; H04W 72/232
See application file for complete search history.

(56) References Cited

U.S. PATENT DOCUMENTS

| 9,756,658 B2 * | 9/2017 | Desai .................... H04W 74/08 |
| 2016/0255616 A1 * | 9/2016 | Martin .............. H04W 74/0833 370/330 |

(Continued)

OTHER PUBLICATIONS

Qualcomm Incorporated:"Procedures for Two-Step RACH."3GPP TSG-RAN WG1 Meeting #98bis, Chongqing, P.R. China, Oct. 14-20, 2019. R1-1911406, total 14 pages.
(Continued)

*Primary Examiner* — Rasheed Gidado
(74) *Attorney, Agent, or Firm* — Slater Matsil, LLP

(57) ABSTRACT

A first terminal device determines a first physical random access resource, where the first terminal device is a first-type terminal device; the first terminal device sends a first random access request message on the first physical random access resource; the first terminal device receives first downlink control information DCI, where the first DCI is used to schedule a first random access response RAR. The first terminal device receives the first RAR based on the first DCI; and the first DCI and second downlink control information DCI received by a second terminal device are carried on a same physical downlink control channel PDCCH, and/or the first RAR and a second RAR scheduled by using the second DCI are carried on a same physical downlink shared channel PDSCH, where the second terminal device is a second-type terminal device.

13 Claims, 6 Drawing Sheets

(51) Int. Cl.
*H04W 72/23* (2023.01)
*H04W 74/00* (2009.01)
*H04W 74/0833* (2024.01)

(56) References Cited

U.S. PATENT DOCUMENTS

2016/0309475 A1* 10/2016 Wong ................ H04W 72/0453
2016/0309507 A1* 10/2016 Park ........................ H04W 4/70
2019/0281639 A1* 9/2019 Yang ..................... H04W 72/20
2021/0392625 A1* 12/2021 Lin ....................... H04W 72/23
2021/0410191 A1* 12/2021 Wu ................... H04W 74/0833

OTHER PUBLICATIONS

"3rd Generation Partnership Project; Technical Specification Group Radio Access Network; NR; Physical layer procedures for control (Release 16)", 3GPP TS 38.213 V16.1.0 (Mar. 2020), Technical Specification, total 156 pages.

* cited by examiner

300

310: A first terminal device determines a first physical random access resource, where the first terminal device is a first-type terminal device 320: The first terminal device sends a first random access request message on the first physical random access resource 330: A network device sends first downlink control information DCI to the first terminal device, and sends second downlink control information DCI to a second terminal device, where the first DCI is used to schedule a first random access response RAR, and the second DCI is used to schedule a second random access response RAR 340: The first terminal device receives the first DCI 350: The network device sends the first RAR and the second RAR 360: The first terminal device receives the first RAR based on the first DCI 370: The first DCI and the second DCI are carried on a same physical downlink control channel PDCCH, and/or the first RAR and the second RAR are carried on a same physical downlink shared channel PDSCH

FIG. 3

RANDOM ACCESS METHOD, APPARATUS, AND SYSTEM

CROSS-REFERENCE TO RELATED APPLICATIONS

This application is a continuation of International Application No. PCT/CN2021/096096, filed on May 26, 2021, which claims priority to Chinese Patent Application No. 202010498461.1, filed on Jun. 4, 2020. The disclosures of the aforementioned applications are hereby incorporated by reference in their entireties.

TECHNICAL FIELD

This application relates to the communication field, and more specifically, to a random access method, an apparatus, and a system.

BACKGROUND

Currently, in the standard, user equipment (UE) of a massive machine type communication (mMTC) service is referred to as reduced capability UE (REDCAP UE). This type of UE may be less complex than other UEs in terms of a bandwidth, power consumption, and a quantity of antennas. For example, this type of UE may have a narrower bandwidth, lower power consumption, and fewer antennas.

In a random access process, whether pieces of random access response (RAR) information corresponding to the REDCAP UE and common UE are transmitted on a same physical downlink control channel (PDCCH) or physical downlink shared channel (PDSCH) resource is not specified in a protocol.

If pieces of downlink control information (DCI) that are of the foregoing two types of UEs and that are used to schedule RARs corresponding to the two types of UEs are separately carried on different PDCCHs for transmission, and RARs corresponding to the two types of UEs are separately carried on different PDSCHs for transmission, signaling overheads are high.

SUMMARY

This application provides a random access method and an apparatus, to reduce signaling overheads.

According to a first aspect, a random access method is provided, including: A first terminal device determines a first physical random access resource, where the first terminal device is a first-type terminal device; the first terminal device sends a first random access request message on the first physical random access resource; the first terminal device receives first downlink control information DCI, where the first DCI is used to schedule a first random access response RAR; the first terminal device receives the first RAR based on the first DCI; and the first DCI and second downlink control information DCI received by a second terminal device are carried on a same physical downlink control channel PDCCH, and/or the first RAR and a second random access response RAR scheduled by using the second DCI are carried on a same physical downlink shared channel PDSCH, where the second terminal device is a second-type terminal device.

Based on the foregoing technical solution, the first DCI used to schedule the first random access response RAR corresponding to the first-type terminal device and the second DCI corresponding to the second-type terminal device are carried on a same PDCCH, or the first RAR scheduled by the first DCI and the second RAR scheduled by the second DCI are carried on a same PDSCH. In other words, two different types of terminal devices may receive DCI on a same PDCCH channel or may receive RARs on a same PDSCH channel. This improves resource utilization, and reduces signaling transmission overheads.

In a possible implementation, the first physical random access resource is not completely the same as a second physical random access resource used by the second terminal device to send a second random access request message.

In a possible implementation, before the first terminal device receives the first downlink control information DCI, the method further includes: The first terminal device receives first indication information, where the first indication information indicates whether the first DCI and the second DCI are carried on a same PDCCH. The first terminal device may correctly receive the first DCI based on the first indication information and a corresponding random access radio network temporary identifier RA-RNTI.

In a possible implementation, before the first terminal device receives the first RAR based on the first DCI, the method further includes: The first terminal device receives second indication information, where the second indication information indicates whether the first RAR and the second RAR are carried on a same PDSCH. The first terminal device can accurately obtain the first RAR based on the second indication information.

In a possible implementation, before the first terminal device receives the first downlink control information DCI, the method further includes: A bandwidth of the first terminal device is greater than or equal to a first threshold, the first DCI and the second DCI are carried on a same PDCCH, and/or the first RAR and the second RAR are carried on a same PDSCH. Whether two types of terminal devices share a PDSCH or a PDCCH may be determined based on a relationship between the bandwidth of the first terminal device and the first threshold. No additional signaling is required for indication. Therefore, signaling overheads are reduced.

In a possible implementation, before the first terminal device receives the first downlink control information DCI, the method further includes: The bandwidth of the first terminal device is less than the first threshold, the first DCI and the second DCI are carried on different PDCCHs, and/or the first RAR and the second RAR are carried on different PDSCHs.

In a possible implementation, the first threshold is determined based on at least one of the following parameters: a bandwidth of a control channel resource set CORESET corresponding to the second terminal device, a size of a time domain resource occupied by the CORESET corresponding to the second terminal device, an interleaving mode of a physical downlink control channel PDCCH corresponding to the second terminal device, or a subcarrier spacing corresponding to the second terminal device.

In a possible implementation, that a first terminal device receives first downlink control information DCI includes: The first DCI and the second DCI are carried on different PDCCHs; and the first terminal device determines a first random access radio network temporary identifier RA-RNTI based on the first physical random access resource, and receives the first DCI based on the first RA-RNTI; or the first DCI and the second DCI are carried on a same PDCCH; and the first terminal device determines a second random access radio network temporary identifier RA-RNTI based on the second physical random access resource, and receives the first DCI based on the second RA-RNTI.

In a possible implementation, that the first terminal device receives the first RAR based on the first DCI includes: When the first RAR and the second RAR are carried on a first PDSCH, a media access control protocol data unit MAC PDU carried on the first PDSCH includes a first sub protocol data unit subPDU, the first subPDU includes third information, and the third information indicates whether the first subPDU includes the first RAR.

In a possible implementation, the third information is carried in any one of the following fields in the first subPDU: a random access preamble identifier RAPID field, a T field, and a MAC RAR field.

In a possible implementation, a bandwidth of the first terminal device is less than a bandwidth of the second terminal device; a quantity of antennas of the first terminal device is less than a quantity of antennas of the second terminal device; power consumption of the first terminal device is less than power consumption of the second terminal device; and/or a quantity of physical downlink control channel PDCCH blind detection times of the first terminal device is less than a quantity of PDCCH blind detection times of the second terminal device.

According to a second aspect, a communication method is provided, including: A network device sends first downlink control information DCI to a first terminal device, and sends second downlink control information DCI to a second terminal device, where the first DCI is used to schedule a first random access response RAR, the second DCI is used to schedule a second random access response RAR, the first terminal device is a first-type terminal device, and the second terminal device is a second-type terminal device; and the network device sends the first RAR to the first terminal device, and sends the second RAR to the second terminal device; and the first DCI and the second DCI are carried on a same physical downlink control channel PDCCH, and/or the first RAR and the second RAR are carried on a same physical downlink shared channel PDSCH.

In a possible implementation, before the network device sends the first downlink control information DCI to the first terminal device, the method further includes: The network device sends first indication information to the first terminal device, where the first indication information indicates whether the first DCI and the second DCI are carried on a same PDCCH.

In a possible implementation, before the network device sends the first RAR to the first terminal device, the method further includes: The network device sends second indication information to the first terminal device, where the second indication information indicates whether the first RAR and the second RAR are carried on a same PDSCH.

In a possible implementation, before the network device sends the first downlink control information DCI to the first terminal device, the method further includes: A bandwidth of the first terminal device is greater than or equal to a first threshold, the first DCI and the second DCI are carried on a same PDCCH, and/or the first RAR and the second RAR are carried on a same PDSCH.

In a possible implementation, before the network device sends the first downlink control information DCI to the first terminal device, the method further includes: A bandwidth of the first terminal device is less than a first threshold, the first DCI and the second DCI are carried on different PDCCHs, and/or the first RAR and the second RAR are carried on different PDSCHs.

In a possible implementation, the first threshold is determined based on at least one of the following parameters: a bandwidth of a control channel resource set CORESET corresponding to the second terminal device, a size of a time domain resource occupied by the CORESET corresponding to the second terminal device, an interleaving mode of a physical downlink control channel PDCCH corresponding to the second terminal device, or a subcarrier spacing corresponding to the second terminal device.

In a possible implementation, that a network device sends first DCI to a first terminal device includes: The first DCI and the second DCI are carried on different PDCCHs, and the network device determines a first random access radio network temporary identifier RA-RNTI based on a first physical random access resource, and sends the first DCI by using the first RA-RNTI, where the first physical random access resource is allocated by the network device to the first terminal device; or the first DCI and the second DCI are carried on a same PDCCH, the network device determines a second random access radio network temporary identifier RA-RNTI based on a second physical random access resource, and sends the first DCI by using the second RA-RNTI, where the second physical random access resource is allocated by the network device to the second terminal device.

In a possible implementation, that the network device sends the first RAR to the first terminal device includes: When the first RAR and the second RAR are carried on a first PDSCH, a media access control protocol data unit MAC PDU carried on the first PDSCH includes a first sub protocol data unit subPDU, the first subPDU includes third information, and the third information indicates whether the first subPDU includes the first RAR.

In a possible implementation, the third information is carried in any one of the following fields in the first subPDU: a random access preamble identifier RAPID field, a T field, and a MAC RAR field.

In a possible implementation, a bandwidth of the first terminal device is less than a bandwidth of the second terminal device; a quantity of antennas of the first terminal device is less than a quantity of antennas of the second terminal device; power consumption of the first terminal device is less than power consumption of the second terminal device; and/or a quantity of physical downlink control channel PDCCH blind detection times of the first terminal device is less than a quantity of PDCCH blind detection times of the second terminal device.

According to a third aspect, a communication apparatus is provided, including: a processing unit, configured to determine a first physical random access resource, and a transceiver unit, configured to send a first random access request message on the first physical random access resource. The transceiver unit is further configured to receive first downlink control information DCI, where the first DCI is used to schedule a first random access response RAR; the transceiver unit is further configured to receive the first RAR based on the first DCI; and the first DCI and second downlink control information DCI received by a second terminal device are carried on a same physical downlink control channel PDCCH, and/or the first RAR and a second random access response RAR scheduled by using the second DCI are carried on a same physical downlink shared channel PDSCH.

In a possible implementation, the first physical random access resource is not completely the same as a second physical random access resource used by the second terminal device to send a second random access request message.

In a possible implementation, the transceiver unit is further configured to receive first indication information, where the first indication information indicates whether the first DCI and the second DCI are carried on a same PDCCH.

In a possible implementation, the transceiver unit is further configured to receive second indication information, where the second indication information indicates whether the first RAR and the second RAR are carried on a same PDSCH.

In a possible implementation, a bandwidth of the first terminal device is greater than or equal to a first threshold, the first DCI and the second DCI are carried on a same PDCCH, and/or the first RAR and the second RAR are carried on a same PDSCH.

In a possible implementation, the bandwidth of the first terminal device is less than the first threshold, the first DCI and the second DCI are carried on different PDCCHs, and/or the first RAR and the second RAR are carried on different PDSCHs.

In a possible implementation, the first threshold is determined based on at least one of the following parameters: a bandwidth of a control channel resource set CORESET corresponding to the second terminal device, a size of a time domain resource occupied by the CORESET corresponding to the second terminal device, an interleaving mode of a physical downlink control channel PDCCH corresponding to the second terminal device, or a subcarrier spacing corresponding to the second terminal device.

In a possible implementation, the first DCI and the second DCI are carried on different PDCCHs, the processing unit is specifically configured to determine a first random access radio network temporary identifier RA-RNTI based on the first physical random access resource. The transceiver unit is specifically configured to receive the first DCI based on the first RA-RNTI. The first DCI and the second DCI are carried on a same PDCCH. The processing unit is specifically configured to determine a second random access radio network temporary identifier RA-RNTI based on the second physical random access resource. The transceiver unit is specifically configured to receive the first DCI based on the second RA-RNTI.

In a possible implementation, when the first RAR and the second RAR are carried on a first PDSCH, a media access control protocol data unit MAC PDU carried on the first PDSCH includes a first sub protocol data unit subPDU, the first subPDU includes third information, and the third information indicates whether the first subPDU includes the first RAR.

According to a fourth aspect, a communication apparatus is provided, including: a transceiver unit, configured to: send first downlink control information DCI to a first terminal device, and send second downlink control information DCI to a second terminal device, where the first DCI is used to schedule a first random access response RAR, the second DCI is used to schedule a second random access response RAR, the first terminal device is a first-type terminal device, and the second terminal device is a second-type terminal device; and the transceiver unit is further configured to: send the first RAR to the first terminal device, and send the second RAR to the second terminal device; the first DCI and the second DCI are carried on a same physical downlink control channel PDCCH, and/or the first RAR and the second RAR are carried on a same physical downlink shared channel PDSCH.

In a possible implementation, the transceiver unit is further configured to send first indication information to the first terminal device, where the first indication information indicates whether the first DCI and the second DCI are carried on a same PDCCH.

In a possible implementation, the transceiver unit is further configured to send second indication information to the first terminal device, where the second indication information indicates whether the first RAR and the second RAR are carried on a same PDSCH.

In a possible implementation, a bandwidth of the first terminal device is greater than or equal to a first threshold, the first DCI and the second DCI are carried on a same PDCCH, and/or the first RAR and the second RAR are carried on a same PDSCH.

In a possible implementation, the bandwidth of the first terminal device is less than the first threshold, the first DCI and the second DCI are carried on different PDCCHs, and/or the first RAR and the second RAR are carried on different PDSCHs.

In a possible implementation, the first threshold is determined based on at least one of the following parameters: a bandwidth of a control channel resource set CORESET corresponding to the second terminal device, a size of a time domain resource occupied by the CORESET corresponding to the second terminal device, an interleaving mode of a physical downlink control channel PDCCH corresponding to the second terminal device, or a subcarrier spacing corresponding to the second terminal device.

In a possible implementation, the apparatus further includes a processing unit; the first DCI and the second DCI are carried on different PDCCHs, the processing unit is configured to determine a first random access radio network temporary identifier RA-RNTI based on a first physical random access resource, where the first physical random access resource is allocated by the processing unit to the first terminal device, and the transceiver unit is specifically configured to send the first DCI by using the first RA-RNTI. The first DCI and the second DCI are carried on a same PDCCH, and the processing unit is configured to determine a second random access radio network temporary identifier RA-RNTI based on a second physical random access resource, where the second physical random access resource is allocated by the processing unit to the second terminal device; and the transceiver unit is specifically configured to send the first DCI by using the second RA-RNTI.

In a possible implementation, when the first RAR and the second RAR are carried on a first PDSCH, a media access control protocol data unit MAC PDU carried on the first PDSCH includes a first sub protocol data unit subPDU, the first subPDU includes third information, and the third information indicates whether the first subPDU includes the first RAR.

According to a fifth aspect, a computer-readable storage medium is provided, where the computer-readable medium is configured to store a computer program, and when the computer program runs on a computer, the computer is enabled to perform the method in any one of the first aspect or the possible implementations of the first aspect.

According to a sixth aspect, a computer-readable storage medium is provided, where the computer-readable medium is configured to store a computer program, and when the computer program runs on a computer, the computer is enabled to perform the method in any one of the second aspect or the possible implementations of the second aspect.

According to a seventh aspect, an embodiment of this application provides a computer-readable storage medium or a non-volatile storage medium. The computer-readable storage medium or the non-volatile storage medium stores instructions or a program. When the instructions or the program are/is run on a computer, the computer is enabled to perform the methods in the foregoing aspects, or when the instructions or the program are/is run on one or more processors, a communication apparatus including the one or more processors is enabled to perform the method in the first aspect or the second aspect.

According to an eighth aspect, an embodiment of this application provides a computer program product, where the computer program product is configured to store a computer program, and when the computer program runs on a computer, the computer is enabled to perform the method according to the first aspect or the second aspect.

According to a ninth aspect, an embodiment of this application provides a chip or an indication information transmission apparatus, including at least one processor, where the at least one processor is coupled to a memory, the memory includes instructions, and the at least one processor runs the instructions to enable the apparatus for transmitting a public signal to perform the method according to the first aspect or the second aspect.

According to a tenth aspect, a communication device is provided. The communication device includes one or more processors, and one or more memories or non volatile storage media. The one or more memories or non-volatile storage media store instructions or a program. When the one or more processors execute the instructions or the program, the communication device or the one or more processors is enabled to perform the method in the first aspect or the second aspect.

According to an eleventh aspect, a terminal apparatus or a communication apparatus is provided, and is configured to perform the method in the first aspect.

According to a twelfth aspect, a network apparatus or a communication apparatus is provided, and is configured to perform the method in the second aspect.

According to a thirteenth aspect, an embodiment of this application provides a communication system, where the communication system includes the communication apparatus in the third aspect and the communication apparatus in the fourth aspect.

BRIEF DESCRIPTION OF THE DRAWINGS

FIG. 3 is a schematic flowchart of a random access method according to an embodiment of this application;

DETAILED DESCRIPTION OF ILLUSTRATIVE EMBODIMENTS

Figure 1:
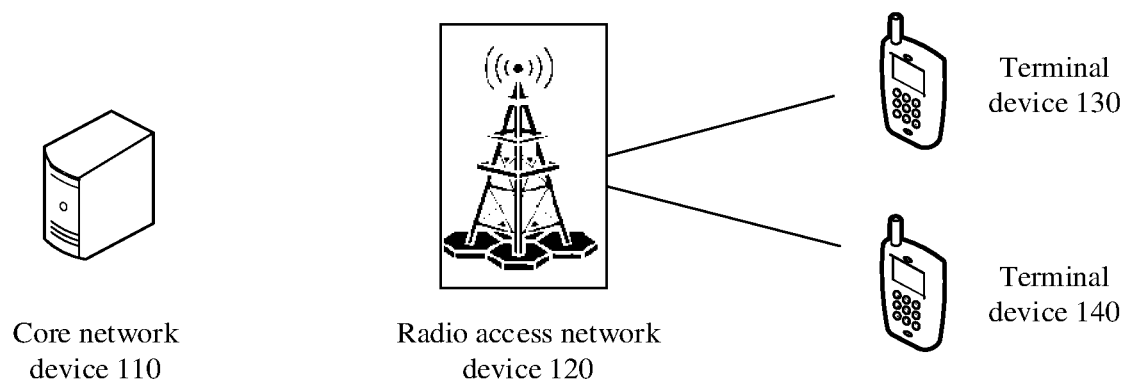
FIG. 1 is a schematic diagram of an architecture of a mobile communication system according to an embodiment of this application.

The following describes technical solutions of this application with reference to accompanying drawings.

Embodiments of this application may be applied to various communication systems, for example, a wireless local area network (WLAN), a narrowband internet of things (NB-IoT) system, a global system for mobile communication (GSM), an enhanced data rate for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, a satellite communication system, a 5th generation (5G) system, and a new communication system emerging in the future.

Mobile communication technologies have profoundly changed people's life, but people's pursuit of a mobile communication technology with higher performance has not stopped. To cope with explosive growth of mobile data traffic, massive mobile communication device connections, and various emerging new services and application scenarios in the future, a 5G mobile communication system emerges. The international telecommunication union (ITU) defines three major application scenarios for 5G and future mobile communication systems: enhanced mobile broadband (eMBB), ultra-reliable and low-latency communication (URLLC), and massive machine type communication (mMTC).

Typical eMBB services include an ultra high-definition video, augmented reality (AR), virtual reality (VR), and the like. These services have a large data transmission amount and a very high transmission rate. Typical URLLC services include wireless control in an industrial manufacturing or production process, motion control and remote repair of a self-driving car and an unmanned aircraft, a tactile interaction application such as remote surgery, and the like. These services have ultra-high reliability, a low latency, a small data transmission amount, and burstiness. Typical mMTC services include smart grid distribution automation, smart cities, and the like. These services have a huge quantity of connected network devices, a small amount of data transmission, and insensitivity of data to transmission latency. These mMTC terminals need to satisfy requirements of low costs and extremely long standby duration.

Different services have different requirements for a mobile communication system. How to better support data transmission requirements of a plurality of different services at the same time is a technical problem that needs to be resolved in a current 5G mobile communication system, for example, how to support both of an mMTC service and an eMBB service, or support both of a URLLC service and an eMBB service.

Research on the mMTC in 5G standards is not widely carried out.

Currently, in the standards, user equipment (UE) of an mMTC service is referred to as reduced capability UE (REDCAP UE), narrow-bandwidth user equipment, an Internet of Things device, or a low-end smart handheld terminal. This type of UE may be less complex than other UEs in terms of a bandwidth, power consumption, and a quantity of antennas. For example, this type of UE has a narrower bandwidth, lower power consumption, and a smaller quantity of antennas. This type of UE may also be referred to as an NR light (NRL) terminal device. A maximum bandwidth supported by mMTC user equipment is less than 100 MHz. It should be noted that the mMTC user equipment in the present invention is not only a machine type communication device, but also may be a smart handheld terminal.

FIG. 1 is a schematic diagram of an architecture of a mobile communication system to which an embodiment of this application is applied. As shown in FIG. 1, the mobile communication system includes a core network device no, a radio access network device 120, and at least one terminal device (a terminal device 130 and a terminal device 140 in FIG. 1). The terminal device is connected to the radio access network device in a wireless manner, and the radio access network device is connected to the core network device in a wireless or wired manner. The core network device and the radio access network device may be independent and different physical devices, a function of the core network device and a logical function of the radio access network device may be integrated into a same physical device, or a part of functions of the core network device and a part of functions of the radio access network device may be integrated into one physical device. The terminal device may be located at a fixed location, or may be mobile. FIG. 1 is only a schematic diagram. The communication system may further include another network device, for example, may further include a wireless relay device and a wireless backhaul device, which are not shown in FIG. 1. Quantities of core network devices, radio access network devices, and terminal devices included in the mobile communication system are not limited in this embodiment of this application.

The radio access network device is an access device used by a terminal device to access the mobile communication system in a wireless manner, and may be a base station NodeB, an evolved NodeB (eNodeB), a base station in a 5G mobile communication system, a base station in a future mobile communication system, an access node in a Wi-Fi system, or the like. A specific technology and a specific device form of the radio access network device are not limited in this embodiment of this application.

The terminal device may also be referred to as a terminal, user equipment UE, a mobile station (MS), a mobile terminal (MT), or the like. The terminal device may be a mobile phone, a tablet computer (pad), a computer with a wireless receiving and sending function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

The radio access network device and the terminal device may be deployed on land, including indoors or outdoors, or handheld or vehicle-mounted; may be deployed on water; or may be deployed on an airplane, a balloon, and a satellite in the air. Application scenarios of the radio access network device and the terminal device are not limited in this embodiment of this application.

This embodiment of this application may be applicable to downlink signal transmission, uplink signal transmission, or device-to-device (D2D) signal transmission. For the downlink signal transmission, a sending device is a radio access network device, and correspondingly a receiving device is a terminal device. For the uplink signal transmission, a sending device is a terminal device, and correspondingly a receiving device is a radio access network device. For the D2D signal transmission, a sending device is a terminal device, and correspondingly a receiving device is also a terminal device. A signal transmission direction is not limited in this embodiment of this application.

Communication between the radio access network device and the terminal device and communication between terminal devices may be performed by using a licensed spectrum, may be performed by using an unlicensed spectrum, or may be performed by using both of a licensed spectrum and an unlicensed spectrum. A spectrum below 6 GHz, a spectrum above 6 GHz, or both of a spectrum below 6 GHz and a spectrum above 6 GHz may be used for communication between the radio access network device and the terminal device, and between terminal devices. Spectrum resources used by the radio access network device and the terminal device are not limited in this embodiment of this application.

To facilitate understanding of the random access method provided in embodiments of this application, a conventional random access process is briefly described. The random access process is as follows.

User equipment UE randomly selects a preamble based on a broadcast message of a base station, and sends, over a preconfigured random access occasion (RO) resource, a random access request message including a preamble sequence.

If the base station successfully receives the preamble sequence and allows access of the UE, the base station sends a feedback message, that is, RAR information, to the UE within a preconfigured random access response (RAR) window.

In addition, the UE monitors, in the preconfigured RAR window, downlink control information (DCI) transmitted on a physical downlink control channel (PDCCH), where the DCI indicates the UE to obtain the RAR information from a media access control (MAC) protocol data unit (PDU) carried on a physical downlink shared channel (PDSCH).

It should be understood that, if the base station cannot receive the preamble sequence due to a conflict between preamble indexes selected by different UEs, a poor channel condition, or the like, the base station does not send the RAR information. In this case, the UE does not detect the DCI and MAC RAR in the RAR window, and a current random access fails.

Figure 2:
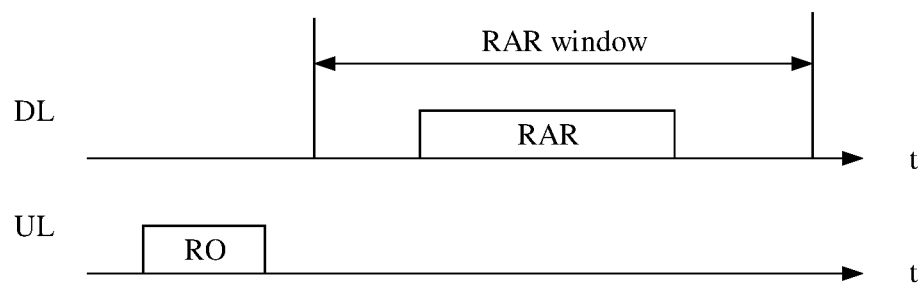
FIG. 2 is a schematic diagram of a random access process of a terminal device.

FIG. 2 is a schematic diagram of first two steps of a random access process on a UE side. As shown in FIG. 2, in a first step, UE sends a random access request message to a base station on an RO resource in a first time period, that is, performs uplink (UL) transmission. In a second step, UE obtains a RAR message sent by the base station in a RAR window in a second time period, that is, performs downlink (DL) transmission.

Before a radio resource control (RRC) connection is established, both of a PDCCH and a PDSCH corresponding to the RAR are transmitted in a control channel resource set CORESET indicated in a broadcast message.

In a conventional technology, whether RAN information corresponding to random access request messages sent by a base station for different types of UEs is sent on a same resource (PDCCH+PDSCH) is not specified in a protocol, and is flexibly processed by the base station.

For different types of UEs, for example, random access information corresponding to legacy UE and random access information corresponding to REDCAP UE are transmitted on a same PDCCH and PDCSH, to reduce signaling overheads. However, in some scenarios, it is not suitable to transmit the random access information corresponding to the legacy UE and the random access information corresponding to the REDCAP UE together. For example, the REDCAP UE may be UE that requires coverage enhancement, and some low-end UEs have only one antenna and poor channel performance, and RARs need to be repeatedly sent to enhance coverage. For another example, for some energy-saving REDCAP UEs, if the random access response information corresponding to the legacy UE and the random access information corresponding to the REDCAP UE are transmitted on a same PDSCH, a large transport block (TB) increases power consumption, and the REDCAP UE needs to decode data of the two types of UEs at the same time to obtain information about the REDCAP UE.

Therefore, whether DCI corresponding to the two types of UEs are carried on a same PDCCH or whether RARs corresponding to the two types of UEs are carried on a same PDCSH may be considered based on an actual situation. The radio access network device (for example, a base station) may determine, based on related information of the REDCAP UE, for example, bandwidth information and a quantity of antennas, whether to send random access information corresponding to the two types of UEs on a same PDCCH and/or a same PDCSH.

This application proposes a random access method 300. FIG. 3 is a schematic flowchart of the random access method 300 according to an embodiment of this application.

310: A first terminal device determines a first physical random access resource, where the first terminal device is a first-type terminal device, and may be reduced capability REDCAP UE.

320: The first terminal device sends a first random access request message on the first physical random access resource, and a second terminal device sends a second random access request message on a second physical random access resource, where the second terminal device is a second-type terminal device, and may be legacy UE such as eMBB UE. The first physical random access resource and the second physical random access resource are not completely the same, that is, at least one of a time domain resource, a frequency domain resource, and a preamble sequence of the first physical random access resource and the second physical random access resource is different.

The first terminal device and the second terminal device are different in terms of a plurality of aspects such as a bandwidth, a quantity of antennas, and power consumption. For example, the first terminal device and the second terminal device may be different only in terms of the bandwidth, and a bandwidth supported by the first terminal device is less than a bandwidth supported by the second terminal device. For another example, the first terminal device and the second terminal device may be different only in terms of the quantity of antennas, and a quantity of antennas of the first terminal device is less than a quantity of antennas of the second terminal device. For another example, the first terminal device and the second terminal device may be different only in terms of the power consumption, and power consumption of the first terminal device is less than power consumption of the second terminal device. For another example, a quantity of blind detections on a physical downlink control channel PDCCH of the first terminal device is less than a quantity of blind detections on a PDCCH of the second terminal device. For another example, a maximum modulation scheme supported by the first terminal device is lower than a maximum modulation scheme supported by the second terminal device. For another example, maximum transmit power of the first terminal device is lower than maximum transmit power of the second terminal device. A bandwidth supported by a terminal device is at least one of a maximum bandwidth that can be reached when the terminal device sends an uplink signal, a maximum bandwidth that can be reached when the terminal device receives a downlink signal, or a maximum bandwidth supported during communication of the terminal device. It should be understood that the first terminal device and the second terminal device may be different in terms of a plurality of aspects. For example, the bandwidth supported by the first terminal device is less than the bandwidth supported by the second terminal device, and the quantity of antennas of the first terminal device is less than the quantity of antennas of the second terminal device. This is not limited in this embodiment of this application.

330: After a network device receives the random access request message, the network device (a base station) determines whether to allow the terminal device to access a network. The network device sends first downlink control information DCI to the first terminal device, and sends second downlink control information DCI to the second terminal device, where the first DCI is used to schedule a first random access response RAR, and the second DCI is used to schedule a second random access response RAR.

340: The first terminal device receives the first DCI, and the second terminal device receives the second DCI.

350: The network device sends the first RAR, and the network device sends the second RAR.

360: The first terminal device receives the first RAR based on the first DCI, and the second terminal device receives the second RAR based on the second DCI.

370: The first DCI and the second DCI are carried on a same physical downlink control channel PDCCH, and/or the first RAR and the second RAR are carried on a same physical downlink shared channel PDSCH. It should be understood that a same PDCCH includes same downlink control information, and DCI of different UEs are on the same PDCCH; and a same PDSCH includes same downlink data, and all downlink data packets are carried on the PDSCH.

In an implementation, optionally, the first DCI and the second DCI are carried on a same PDCCH, and the first RAR and the second RAR are carried on different PDSCHs. That the network device sends the first DCI and the second DCI on a same PDCCH may be understood as that the network device places DCI corresponding to the REDCAP UE and DCI corresponding to the legacy UE in one piece of DCI for sending, where the DCI information corresponding to the REDCAP UE may be indicated by using a reserved bit field in conventional DCI. The network device sends the first RAR and the second RAR on different PDSCHs, a PDSCH scheduled by using the DCI corresponding to the REDCAP UE is different from a PDSCH scheduled by using the DCI corresponding to the legacy UE.

In an implementation, optionally, the first DCI and the second DCI are carried on different PDCCHs, and the first RAR and the second RAR are carried on a same PDSCH. The network device separately sends the first DCI and the second DCI on different PDCCHs, the first RAR and the second RAR are carried on a same PDSCH and sent to the REDCAP UE and the legacy UE, and a PDSCH scheduled by using the first DCI is the same as a PDSCH scheduled by using the second DCI.

In an implementation, optionally, the first DCI and the second DCI are carried on a same PDCCH, and the first RAR and the second RAR are carried on a same PDSCH. To be specific, the network device sends the first DCI and the second DCI on a same PDCCH, and sends the first RAR and the second RAR on a same PDSCH. In this case, the first-type UE and the second-type UE may share PDCCH and PDSCH resources, resources for receiving DCI by the two types of UEs are the same, and RARs are also carried on a same PDSCH. This improves resource utilization, and reduces signaling overheads.

In the technical solution provided in this embodiment of this application, the first DCI used to schedule the first random access response RAR corresponding to the first-type terminal device and the second DCI corresponding to the second-type terminal device are carried on a same PDCCH. The first RAR scheduled by using the first DCI and the second RAR scheduled by using the second DCI are carried on a same PDSCH. Signaling overheads can be reduced by using both of the two technical solutions.

The REDCAP UE needs to learn in advance whether the network device sends RAR information corresponding to the two types of UEs on a same PDCCH or PDCSH. Otherwise, the REDCAP UE may fail to correctly receive DCI or a RAR corresponding to the REDCAP UE. For example, when the two types of UEs share a same PDCCH, the REDCAP UE needs to receive the DCI corresponding to the REDCAP UE in a same manner of receiving the DCI by the legacy UE. When the two types of UEs do not share a same PDCCH, the REDCAP UE needs to receive the DCI corresponding to the REDCAP UE in a manner different from a manner of receiving the DCI by the legacy UE. In other words, the REDCAP UE and the legacy UE need to receive respective DCI in different manners. In this case, DCI corresponding to the two types of UEs may be distinguished by using different scrambling code or reserved bits. If the REDCAP UE does not learn in advance whether the DCI corresponding to the REDCAP UE and the DCI corresponding to the legacy UE share a same PDCCH, the REDCAP UE may receive the DCI in a manner of receiving the DCI by the legacy UE. As a result, a receiving error is caused, and RAR information corresponding to the REDCAP UE cannot be obtained.

Therefore, the REDCAP UE learns whether the network device sends DCI corresponding to the two types of UEs on a same PDCCH or whether RAR information corresponding to the two types of UEs are placed on a same PDCSH, so that the REDCAP UE can correctly receive the first DCI and the first RAR corresponding to the REDCAP UE.

In an implementation, optionally, the network device may indicate, by using signaling, whether the two types of UEs share one PDCCH and/or PDSCH.

Optionally, the signaling may be RRC signaling, MAC signaling, a system message, a broadcast message, or DCI, and may directly indicate a state in which the two types of UEs currently share one PDCCH and/or PDSCH or not. Alternatively, the state may be indicated by toggling (toggle) a bit. For example, "0" indicates that a current shared/independent state remains unchanged, and "1" indicates that a current state is changed. This is not limited in this embodiment of this application.

Optionally, before the network device sends the first downlink control information DCI to the first terminal device, the network device sends first indication information to the first terminal device, where the first indication information indicates whether the first DCI and the second DCI are carried on a same PDCCH. If the first DCI and the second DCI are carried on different PDCCHs, the network device determines, based on the first physical random access resource, a first random access radio network temporary identifier (RA-RNTI), and sends the first DCI through a PDCCH scrambled by using the first RA-RNTI. Alternatively, the network device determines a second RA-RNTI based on the second physical random access resource, and sends the second DCI by using a PDCCH scrambled by using the second RA-RNTI. If the first DCI and the second DCI are carried on a same PDCCH, the network device determines the second RA-RNTI based on the second physical random access resource, and sends the DCI through the PDCCH scrambled by using the second RA-RNTI, where the DCI includes DCI information corresponding to the REDCAP UE and DCI information corresponding to the legacy UE.

It should be understood that calculation of the RA-RNTI is related to a physical random access resource, and a specific calculation manner is as follows:

$$\text{RA-RNTI}=1+t\_id+10*f\_id$$

t_id represents a first subframe sent by the preamble, and f_id represents a frequency domain location (f_id<6).

Correspondingly, the first terminal device receives the first indication information, and determines, based on the first indication information, whether the first DCI and the second DCI are carried on a same PDCCH. If the first indication information indicates that the first DCI and the second DCI are carried on different PDCCHs, the first terminal device determines the first RA-RNTI based on the first physical random access resource, and receives the first DCI from a corresponding PDCCH based on the first RA-RNTI. If the first indication information indicates that the first DCI and the second DCI are carried on a same PDCCH, the first terminal device receives the first DCI from a corresponding PDCCH based on the second RA-RNTI, where the first DCI includes the DCI corresponding to the REDCAP UE and the DCI corresponding to the legacy UE.

It should be understood that, that the first DCI and the second DCI are carried on a same PDCCH means that time-frequency resources on which the first DCI and the second DCI are located are the same. That the first DCI and the second DCI are carried on different PDCCHs means that time-frequency resources on which the first DCI and the second DCI are located are different.

Optionally, before the network device sends the first RAR to the first terminal device, the network device sends second indication information to the first terminal device, where the second indication information indicates whether the first RAR and the second RAR are carried on a same PDSCH. Correspondingly, the first terminal device receives the second indication information, and receives the first RAR based on the second indication information. That the first RAR and the second RAR are carried on a same PDSCH means that time-frequency resources on which the first RAR and the second RAR are located are the same. That the first RAR and the second RAR are carried on different PDSCHs means that time-frequency resources on which the first RAR and the second RAR are located are different.

It should be understood that the first indication information and the second indication information may be included in different signaling, or may be included in same signaling. Optionally, when the first indication information and the second indication information are included in the same signaling, whether the first DCI and the second DCI are carried on a same PDCCH may be indicated by using one piece of signaling, or whether the first RAR and the second RAR are carried on a same PDSCH may be indicated by using one piece of signaling. The first terminal device may learn, by receiving the signaling, whether the first DCI and the second DCI are carried on a same PDCCH and whether the first RAR and the second RAR are carried on a same PDSCH. Optionally, when the first indication information and the second indication information are included in the same signaling, different indication fields may be used for separate indication. To be specific, a first indication field indicates whether the first DCI and the second DCI are carried on a same PDCCH, and the first indication field indicates whether the first RAR and the second RAR are carried on a same PDSCH.

When the two types of UEs share one PDCCH, the second indication information indicating whether the two types of UEs share one PDSCH may also be information in a reserved bit in conventional DCI, and the reserved bit indicates whether the two types of UEs share one PDSCH. For example, if the reserved bit in the conventional DCI is "1", it indicates that the two types of UEs share one PDSCH. If the reserved bit in the conventional DCI is "0", it indicates that the two types of UEs do not share one PDSCH. Therefore, the second indication information may not be indicated by using separate signaling. To be specific, the legacy UE still parses the DCI in a conventional manner, and does not parse the reserved bit information. The REDCAP UE parses the DCI in a new manner, and reads a bit that is considered by the legacy UE as the reserved bit information. In this way, a manner in which the legacy UE receives the DCI is not changed, and the legacy UE is not affected. In addition, a bit that is not used in the original DCI is used, and signaling overheads are not increased.

When the two types of UEs share one PDCCH, if there is no second indication information to notify the REDCAP UE whether to share one PDSCH with the legacy UE, the REDCAP UE may not accurately determine a PDSCH corresponding to the REDCAP UE. For example, when the two types of UEs do not share one PDSCH, the REDCAP UE cannot determine whether information in the reserved bit is scheduling information of a second PDSCH or padding bit information (generally, a base station randomly pads bit information in the reserved bit), and may mistakenly consider a first PDSCH indicated in the DCI as a PDSCH corresponding to the REDCAP UE, but does not obtain information that is in a reserved field and that is used to schedule a second PDSCH corresponding to the REDCAP UE. Therefore, the REDCAP UE can accurately obtain the RAR corresponding to the REDCAP UE by using the second indication information.

It should be understood that the technical solution in this embodiment of this application is also applicable to a case in which the first DCI and the second DCI are carried on different PDCCHs and the first RAR and the second RAR are also carried on different PDSCHs.

In this embodiment of this application, whether the two types of UEs share one PDCCH and/or PDSCH does not affect receiving DCI and obtaining RAR information by the legacy UE. This has no improvement compared with the conventional technology.

In another implementation, optionally, a UE side and a network device side may determine, according to a predefined rule, whether the two types of UEs share one PDCCH and/or PDSCH.

Specifically, the predefined rule may be as follows: If a bandwidth of the REDCAP UE is greater than or equal to a first threshold, the REDCAP UE and the network device may determine that the first DCI and the second DCI are carried on a same PDCCH, and/or that the first RAR and the second RAR are carried on a same PDSCH.

If the bandwidth of the REDCAP UE is less than the first threshold, the first DCI and the second DCI are carried on different PDCCHs, and/or the first RAR and the second RAR are carried on different PDSCHs.

It should be understood that if the UE and the network device consider by default that the first DCI and the second DCI are carried on a same PDCCH or carried on different PDCCHs, the UE and the network device only need to determine whether the first RAR and the second RAR are carried on a same PDSCH. If the UE and the network device consider by default that the first RAR and the second RAR are carried on a same PDSCH or carried on different PDSCHs, the UE and the network device only need to determine whether the first DCI and the second DCI are carried on a same PDCCH. If the UE and the network device need to determine whether the first DCI and the second DCI are carried on a same PDCCH and whether the first RAR and the second RAR are carried on a same PDSCH, and the UE and the network device determine, according to the predefined rule, that the two types of UEs use a same PDCCH, the two types of UEs use a same PDSCH. When the UE and the network device determine, according to the predefined rule, that the two types of UEs use different PDCCHs, the two types of UEs use different PDSCHs.

Optionally, the first threshold may be determined based on at least one of parameters such as a size of a frequency domain resource occupied by a control resource set (Control-Resource Set, CORESET) corresponding to the second terminal device (legacy UE), an interleaving mode of a PDCCH corresponding to the legacy UE, and a subcarrier spacing corresponding to the legacy UE. It should be understood that the first threshold may alternatively be preset, or may be determined based on other indication information. This is not limited in this embodiment of this application.

Figure 4:
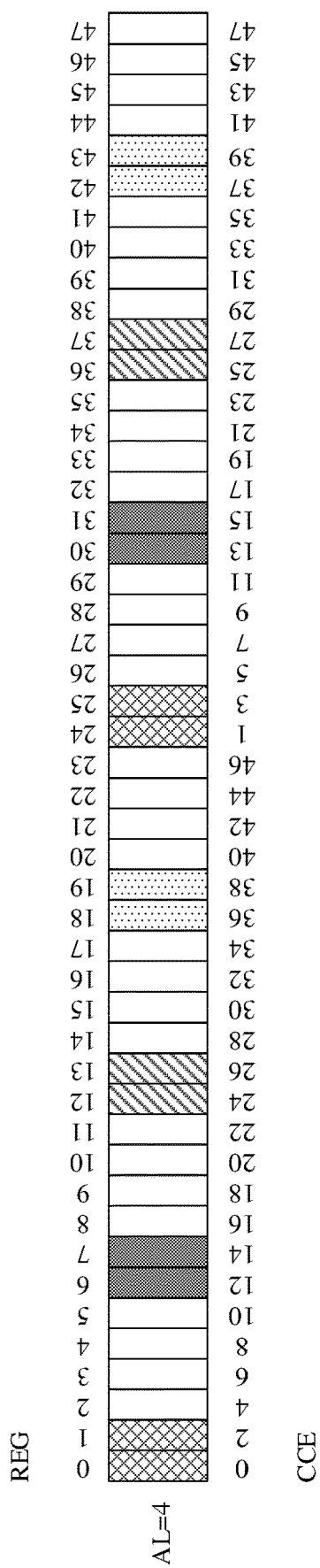
FIG. 4 is a schematic diagram of mapping control information to a frequency domain resource of a CORESET when an interleaving depth is 2.

It should be understood that interleaving refers to how control information is mapped to a frequency domain resource of a control channel resource set CORESET. If interleaving is not performed, the control information is continuously mapped on a physical resource. If interleaving is performed, the control information is mapped to a plurality of resources based on an interleaving depth, and the plurality of resources may be discontinuous. The interleaving depth is configurable. For example, the interleaving depth may be 2, 3, and 6. For example, the interleaving depth is 2 and an aggregation level of the PDCCH is 4. As shown in FIG. 4, an x-coordinate is a frequency domain resource sequence number, and resources in different grids correspond to different candidates (candidate locations). It can be seen that when the interleaving depth is 2, PDCCH resources are evenly allocated to left and right resources, that is, two resource elements in a high frequency band and two resource elements in a low frequency band. A resource element is a resource block (RB), a resource element group bundle (REG bundle), a control channel element (CCE), or the like.

The base station sends a broadcast message. Both of the REDCAP UE and the legacy UE may initiate a random access request based on the broadcast message, and a control channel resource indicated in the broadcast message is a CORESET corresponding to the legacy UE. In this case, the REDCAP UE may learn a bandwidth value of the CORESET and an interleaving mode of a PDCCH corresponding to the legacy UE. The interleaving mode of the PDCCH corresponding to the legacy UE may be determined in a manner predefined in a protocol. For example, the protocol may predefine that interleaving is performed and an interleaving depth is 2. The base station side may learn information such as a bandwidth of the REDCAP UE based on the random access request information initiated by the REDCAP UE.

The following describes a case in which the UE and the base station need to determine whether the first DCI and the second DCI are carried on a same PDCCH and whether the first RAR and the second RAR are carried on a same PDSCH.

When PDCCHs corresponding to the legacy UE are interleaved, optionally, if a bandwidth of the REDCAP UE is less than a bandwidth of the CORESET corresponding to the legacy UE, the two types of UEs do not share a same PDCCH or PDSCH. The REDCAP UE receives the first DCI based on the second RA-RNTI, and obtains, based on a PDSCH indicated by the first DCI, RAR information corresponding to the first DCI.

If the bandwidth of the REDCAP UE is greater than or equal to the bandwidth of the CORESET corresponding to the legacy UE, the two types of UEs share a same PDCCH and PDSCH. The REDCAP UE receives the first DCI based on the first RA-RNTI, and obtains, based on the PDSCH indicated by the first DCI, the RAR information corresponding to the first DCI.

It should be understood that if a bandwidth supported by the REDCAP UE is 10 MHz, a bandwidth of the CORESET corresponding to the legacy UE is 20 MHz, and the legacy UE transmits DCI in a bandwidth range of 20 MHz, the REDCAP UE may detect the DCI only on a resource of 10 MHz in the total bandwidth range of 20 MHz. If the base station sends the DCI in a bandwidth rang that is beyond 10 MHz and in which the REDCAP UE cannot receive the DCI, the REDCAP UE cannot receive the DCI or receives only a part of the DCI. Therefore, when the bandwidth of the REDCAP UE is less than the bandwidth of the CORESET corresponding to the legacy UE, the two types of UEs do not share a same PDCCH or PDSCH.

Similarly, if a bandwidth supported by the REDCAP UE is 30 MHz, a bandwidth of the CORESET corresponding to the legacy UE is 20 MHz, and the legacy UE transmits DCI in a bandwidth range of 20 MHz, the REDCAP UE may detect the DCI in a bandwidth range of 30 MHz, the base station sends the DCI in a bandwidth range that is of 20 MHz and in which the legacy UE can receive the DCI, the REDCAP UE can definitely receive the DCI. Therefore, when the bandwidth of the REDCAP UE is greater than or equal to the bandwidth of the CORESET corresponding to the legacy UE, the two types of UEs may share one PDCCH and PDSCH.

When PDCCHs corresponding to the legacy UE are not interleaved, that is, DCI sent by the legacy UE is transmitted on consecutive physical resources in the CORESET, optionally, if a bandwidth of the REDCAP UE is less than a bandwidth of the CORESET multiplied by $2^u$/symbol_num, the two types of UEs do not share a same PDCCH or PDSCH. If the bandwidth of the REDCAP UE is greater than or equal to the CORESET bandwidth multiplied by $2^u$/symbol_num, the two types of UEs share the same PDCCH and PDSCH. In this case, u is a subcarrier spacing parameter, symbol_num is a quantity of symbols of a CORESET in time domain, and when a subcarrier spacing (SCS) is 15 kHz, u=0; or when the SCS is 30 kHz, u=1. It should be understood that a bandwidth of a CORESET may be a bandwidth of a CORESET 0.

When RAR information corresponding to the REDCAP UE and RAR information corresponding to the legacy UE share a same PDSCH, a field in a MAC PDU needs to be designed and indicated to the REDCAP UE, so that the REDCAP UE obtains, from the MAC PDU carried by the PDSCH, the RAR information corresponding to the RED-CAP UE.

Optionally, when the first RAR corresponding to the REDCAP UE and the second RAR corresponding to the legacy UE are carried on a first PDSCH, the MAC PDU carried on the first PDSCH includes a first sub protocol data unit subPDU, the first subPDU includes third information, and the third information indicates whether the first subPDU includes the first RAR.

Optionally, the third information is carried in any one of the following fields in the first subPDU: a random access preamble identifier (Random Access Preamble Identifier, RAPID) field, a T field, and a MAC RAR field.

For ease of understanding of this embodiment of this application, the following briefly describes the MAC PDU in a random access procedure.

Figure 5:
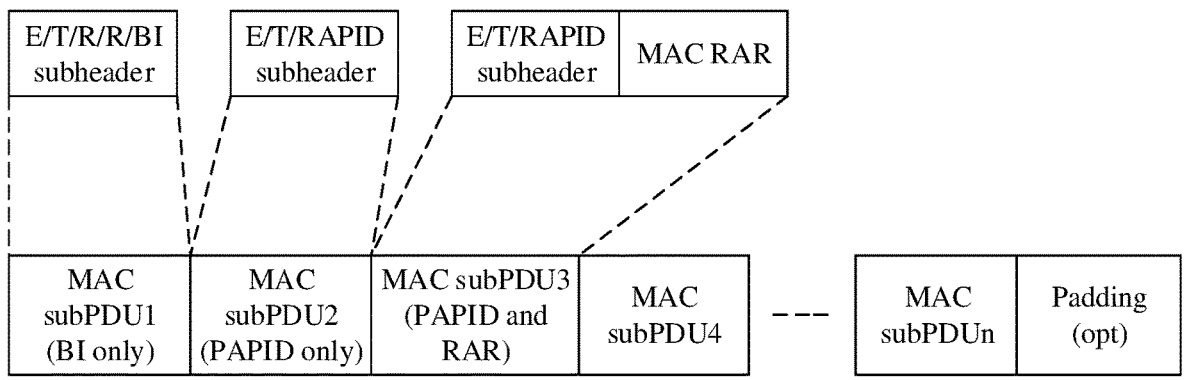
FIG. 5 is a schematic diagram of a structure of composition of a MAC PDU.

As shown in FIG. 5, the MAC PDU includes one or more MAC sub protocol data units subPDUs and optional padding, and each subPDU corresponds to one MAC subheader (MAC subheader). There are the following types of MAC subheaders:

(1) a MAC subheader having only a backoff indicator (Backoff Indicator, BI);
(2) a MAC subheader having a RAPID; and
(3) a MAC subheader having a RAPID and a MAC RAR.

If a MAC subheader includes a BI, the subheader appears only once and is located at a first MAC subheader of a MAC subheader. A MAC subPDU with a MAC subheader having only a RAPID and a MAC subPDU with a MAC subheader having a MAC RAR and a RAPID may be placed anywhere between a MAC subPDU with a MAC subheader having a BI (if present) and the padding (if present).

Figure 6:
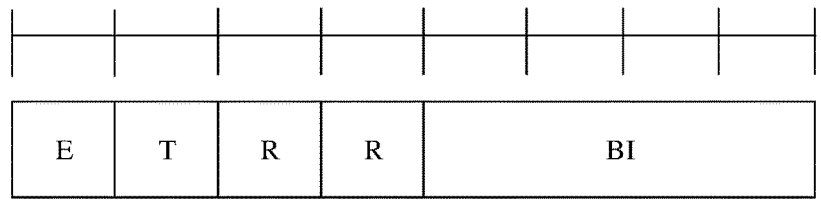
FIG. 6 is a schematic diagram of a structure of a MAC subheader having a BI.

FIG. 6 is a schematic diagram of a structure of a MAC subheader having a BI. As shown in FIG. 6, the MAC subheader having the BI includes five header fields E/T/R/R/BI.

The BI specifies a time range that the UE needs to wait before the UE retransmits the preamble. If the UE does not receive the RAR within a RAR time window or no preamble in a received RAR is consistent with a preamble of the UE, receiving of the RAR is considered to be failed. In this case, the UE needs to wait for a period of time and initiate a random access request again. A waiting time is a value randomly selected from a waiting time range specified by 0 to the BI. A value of the BI reflects load of a cell. If a large quantity of UEs access the cell, the value of the BI may be set to a large value. If a small quantity of UEs access the cell, the value of the BI may be set to a small value. This is determined by the base station.

Content of the RAPID corresponds to a preamble index when the UE initiates random access. In addition, if RAR feedback corresponding to the preamble index is used to respond to a system information request (SI request), there is no MAC RAR following a RAPID in a MAC subheader, and the MAC subheader is a MAC subheader having only a RAPID.

Figure 7:
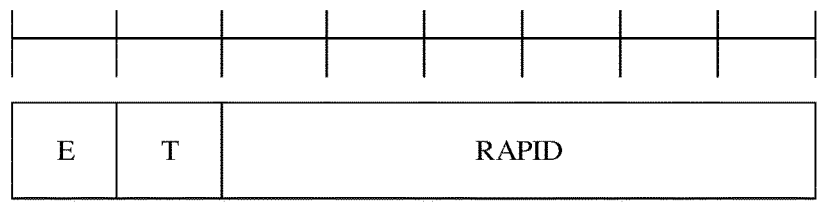
FIG. 7 is a schematic diagram of a structure of a MAC subheader having a RAPID.

The RAPID is obtained when the base station detects the preamble. If the UE finds that a value of the RAPID is corresponding to an index used when the UE sends the preamble, it is considered that the corresponding RAR is successfully received. FIG. 7 is a schematic diagram of a structure of a MAC subheader having a RAPID. As shown in FIG. 7, the MAC subheader having the RAPID includes three fields E/T/RAPID.

Figure 8:
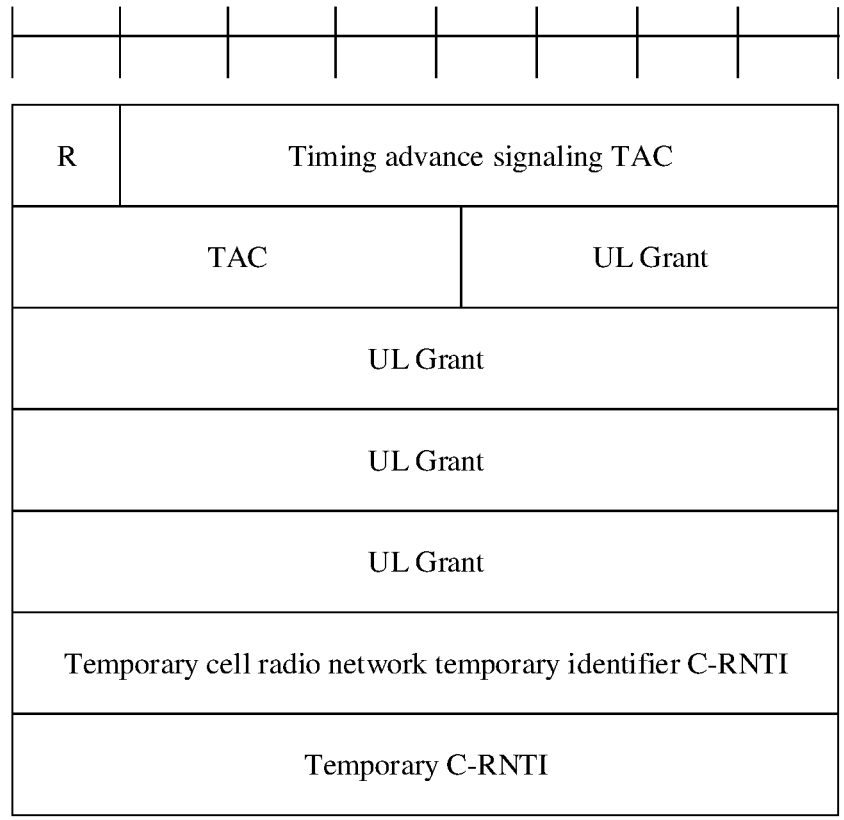
FIG. 8 is a schematic diagram of a structure of composition of a MAC RAR.

If RAR feedback corresponding to preamble index information carried in the RAPID in the subheader is used for random access response, there is a MAC RAR following the RAPID in the MAC subheader, and the MAC subheader is a MAC subheader having a RAPID and a MAC RAR. A composition structure of the MAC RAR is shown in FIG. 8.

Table 1 describes the fields in the MAC subheader.

TABLE 1

Parameters Of Fields In A Mac Subheader In A Mac Pdu

| Parameter name | Parameter description |
|---|---|
| R (Reserved) field | A value is 0 |
| E (Extension) field | Indicate whether a current MAC subPDU is a last MAC subPDU<br>0: Indicate that a current MAC subPDU is a last MAC subPDU<br>1: Indicate that there is at least one MAC subPDU following a current MAC subPDU |
| T (Type) field | 0: Indicate a MAC subheader having a BI<br>1: Indicate a MAC subheader having a RAPID |
| BI field | Indicate an overload status of a current cell |
| RAPID field | Indicate a transmitted random access preamble |

TABLE 2

Backoff Parameter Values

| Index | Backoff parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved |
| 15 | Reserved |

After the UE sends the preamble, the UE monitors, in the RAR time window, a PDCCH carrying the RA-RNTI, to receive a RAR of the UE.

Specifically, when the first RAR corresponding to the REDCAP UE and the second RAR corresponding to the legacy UE are carried on a same PDSCH, and preamble indexes used by the REDCAP UE and the legacy UE are different, RARs corresponding to the two types of UEs may be distinguished by using RAPIDs in MAC subheaders, and the RAPID indicate preamble index information.

Because the first random access resource corresponding to the REDCAP UE is not completely the same as the second random access resource corresponding to the legacy UE, preamble indexes used by the REDCAP UE and the legacy UE may be the same. In this case, the RAR corresponding to the REDCAP UE may be indicated by using a T field in the MAC subheader, or the RAR corresponding to the REDCAP UE may be indicated by using a reserved bit in the MAC RAR field.

For example, if the T field in the MAC subheader is "0", and the MAC subheader is not located at a first MAC subheader of the MAC subheader, a subPDU corresponding to the MAC subheader includes the first RAR corresponding to the REDCAP UE. It should be understood that, if there is a MAC subheader having a BI, BI indication information is still placed in the first subPDU, and a subPDU corresponding to a subsequent MAC subheader whose T field is "0" includes the first RAR.

For another example, the second RAR corresponding to the legacy UE is preferentially placed, and a subPDU including the first RAR corresponding to the REDCAP UE follows a subPDU including the second RAR corresponding to the legacy UE. In this way, after the legacy UE obtains the RAR information corresponding to the legacy UE, the legacy UE ends reading of a PDSCH. This does not affect information obtaining, a delay, and the like of the legacy UE. In addition, if there is no BI indication information, it can also be ensured that the first RAR corresponding to the REDCAP UE is not in the first subPDU.

For another example, if there is no BI or a subPDU of the legacy UE, a first subheader is indicated according to the BI: A reserved field is "1" or the BI field is indicated as a reservation status "14" or "15", as shown in Table 2. In this case, when the legacy UE reads the BI, the legacy UE considers that the BI is error decoding, and subsequent reading of the REDCAP UE is not affected.

For another example, if there is no BI or a subPDU of the legacy UE, a first subheader is indicated based on a legacy UE RAPID format, but the RAPID indicates a preamble index that is not detected in a corresponding RO; and the REDCAP UE starts from a second subheader, and the second subheader is indicated according to the foregoing method.

For another example, if a reserved bit in the MAC RAR field is "1", a RAR corresponding to the REDCAP UE is indicated. If a reserved bit in the MAC RAR field is "0", a RAR corresponding to the legacy UE is indicated.

Figure 9:
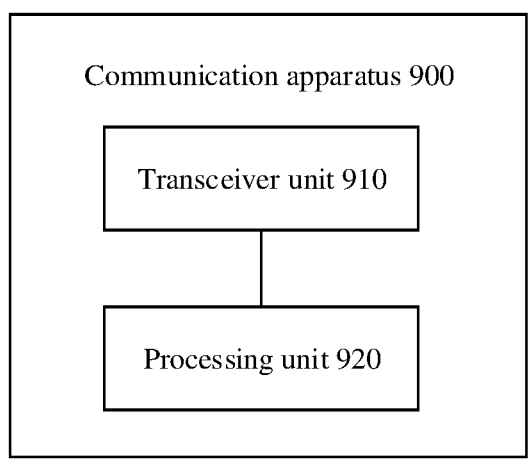
FIG. 9 is a schematic block diagram of a communication apparatus according to an embodiment of this application.

An embodiment of this application provides a communication apparatus 900. FIG. 9 is a schematic block diagram of the communication apparatus.

The communication apparatus 900 includes a processing unit 910. Optionally, the communication apparatus 900 may further include a transceiver unit 920. For example, the communication apparatus may be applied to a terminal device, and the communication apparatus may be a chip used in a terminal device, or may be another combined device, another component, or the like that has a function of the foregoing terminal device. When the communication apparatus 900 is applied to a terminal device, the transceiver unit 920 may be a transceiver, the transceiver may include an antenna, a radio frequency circuit, and the like, and the processing unit 910 may be a processor or a processing circuit, for example, a baseband processor. The baseband processor includes one or more CPUs. When the communication apparatus 900 is a component that has a function of the foregoing terminal device, the transceiver unit 920 may be a radio frequency unit, and the processing unit 910 may be a processor or a processing circuit, for example, a baseband processor. When the communication apparatus 900 is a chip system, the transceiver unit 920 may be an input/output interface of a chip (for example, a baseband chip), and the processing unit 910 may be a processor or a processing circuit of the chip system, and may include one or more central processing units. It should be understood that the processing unit 910 in this embodiment of this application may be implemented by a processor or a processor-related circuit component (or referred to as a processing circuit), and the transceiver unit 920 may be implemented by a transceiver or a transceiver-related circuit component.

Specifically, the processing unit 910 is configured to determine a first physical random access resource.

The transceiver unit 920 is configured to send a first random access request message on the first physical random access resource.

The transceiver unit 920 is further configured to receive first downlink control information DCI, where the first DCI is used to schedule a first random access response RAR.

The transceiver unit is further configured to receive the first RAR based on the first DCI.

The first DCI and second downlink control information DCI received by a second terminal device are carried on a same physical downlink control channel PDCCH, and/or the first RAR and a second random access response RAR scheduled by using the second DCI are carried on a same physical downlink shared channel PDSCH.

Optionally, the first physical random access resource is not completely the same as a second physical random access resource used by the second terminal device to send a second random access request message.

Optionally, the transceiver unit 920 is further configured to receive first indication information, where the first indication information indicates whether the first DCI and the second DCI are carried on a same PDCCH.

Optionally, the transceiver unit 920 is further configured to receive second indication information, where the second indication information indicates whether the first RAR and the second RAR are carried on a same PDSCH.

Optionally, a bandwidth of the first terminal device is greater than or equal to a first threshold, and the first DCI and the second DCI are carried on a same PDCCH, and/or the first RAR and the second RAR are carried on a same PDSCH.

Optionally, the bandwidth of the first terminal device is less than the first threshold, the first DCI and the second DCI are carried on different PDCCHs, and/or the first RAR and the second RAR are carried on different PDSCHs.

Optionally, the first threshold is determined based on at least one of the following parameters: a bandwidth of a control channel resource set CORESET corresponding to the second terminal device, a size of a time domain resource occupied by the CORESET corresponding to the second terminal device, an interleaving mode of a physical downlink control channel PDCCH corresponding to the second terminal device, or a subcarrier spacing corresponding to the second terminal device.

Optionally, the first DCI and the second DCI are carried on different PDCCHs, the processing unit is specifically configured to determine a first random access radio network temporary identifier RA-RNTI based on the first physical random access resource. The transceiver unit is specifically configured to receive the first DCI based on the first RA-RNTI. The first DCI and the second DCI are carried on a same PDCCH, and the processing unit is specifically configured to determine a second random access radio network temporary identifier RA-RNTI based on the second physical random access resource. The transceiver unit is specifically configured to receive the first DCI based on the second RA-RNTI.

Optionally, when the first RAR and the second RAR are carried on a first PDSCH, a media access control protocol data unit MAC PDU carried on the first PDSCH includes a first sub protocol data unit subPDU, the first subPDU includes third information, and the third information indicates whether the first subPDU includes the first RAR.

Figure 10:
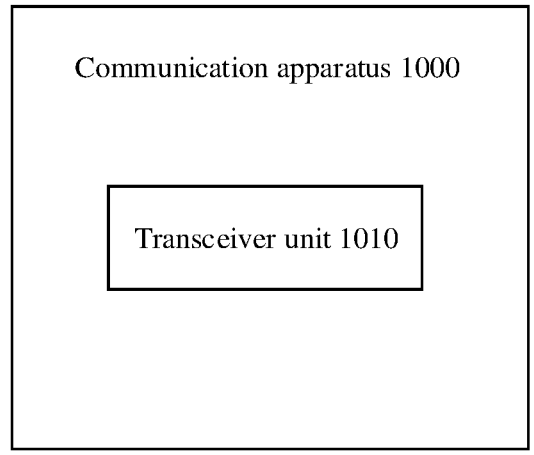
FIG. 10 is a schematic block diagram of another communication apparatus according to an embodiment of this application.

An embodiment of this application provides another communication apparatus 1000. FIG. 10 is a schematic block diagram of the another communication apparatus.

The communication apparatus woo includes a transceiver unit 1010. Optionally, the apparatus may further include a processing unit 1020. For example, the communication apparatus woo may be applied to an access network device, and the communication apparatus woo may be a chip used in an access network device, or another combined device, another component, or the like that has a function of the foregoing access network device. When the communication apparatus woo is applied to an access network device, the transceiver unit 1010 may be a transceiver, the transceiver may include an antenna, a radio frequency circuit, and the like, and the processing unit 1020 may be a processor or a processing circuit, for example, a baseband processor. The baseband processor may include one or more CPUs. When the communication apparatus woo is a component that has a function of the foregoing access network device, the transceiver unit 1010 may be a radio frequency unit, and the processing unit 1020 may be a processor or a processing circuit, for example, a baseband processor. When the communication apparatus woo is a chip system, the transceiver unit 1010 may be an input/output interface of a chip (for example, a baseband chip), and the processing unit 1020 may be a processor (or a processing circuit) of the chip system, and may include one or more central processing units. It should be understood that the processing unit 1020 in this embodiment of this application may be implemented by a processor or a processor-related circuit component (or referred to as a processing circuit), and the transceiver unit 1010 may be implemented by a transceiver or a transceiver-related circuit component.

Specifically, the transceiver unit 1010 is configured to: send first downlink control information DCI to a first terminal device, and send second downlink control information DCI to a second terminal device, where the first DCI is used to schedule a first random access response RAR, the second DCI is used to schedule a second random access response RAR, the first terminal device is a first-type terminal device, and the second terminal device is a second-type terminal device.

The transceiver unit 1010 is further configured to: send the first RAR to the first terminal device, and send the second RAR to the second terminal device.

The first DCI and the second DCI are carried on a same physical downlink control channel PDCCH, and/or the first RAR and the second RAR are carried on a same physical downlink shared channel PDSCH.

Optionally, the transceiver unit 1010 is further configured to send first indication information to the first terminal device, where the first indication information indicates whether the first DCI and the second DCI are carried on a same PDCCH.

Optionally, the transceiver unit 1010 is further configured to send second indication information to the first terminal device, where the second indication information indicates whether the first RAR and the second RAR are carried on a same PDSCH.

Optionally, a bandwidth of the first terminal device is greater than or equal to a first threshold, the first DCI and the second DCI are carried on a same PDCCH, and/or the first RAR and the second RAR are carried on a same PDSCH.

Optionally, the bandwidth of the first terminal device is less than the first threshold, the first DCI and the second DCI are carried on different PDCCHs, and/or the first RAR and the second RAR are carried on different PDSCHs.

Optionally, the first threshold is determined based on at least one of the following parameters: a bandwidth of a control channel resource set CORESET corresponding to the second terminal device, a size of a time domain resource occupied by the CORESET corresponding to the second terminal device, an interleaving mode of a physical downlink control channel PDCCH corresponding to the second terminal device, or a subcarrier spacing corresponding to the second terminal device.

Optionally, the apparatus further includes a processing unit 1020.

The first DCI and the second DCI are carried on different PDCCHs, and the processing unit 1020 is configured to determine a first random access radio network temporary identifier RA-RNTI based on a first physical random access resource, where the first physical random access resource is allocated by the processing unit 1020 to the first terminal device.

The transceiver unit 1010 is specifically configured to send the first DCI by using the first RA-RNTI.

The first DCI and the second DCI are carried on a same PDCCH, and the processing unit 1020 is configured to determine a second random access radio network temporary identifier RA-RNTI based on a second physical random access resource, where the second physical random access resource is allocated by the processing unit 1020 to the second terminal device.

The transceiver unit 1010 is specifically configured to send the first DCI by using the second RA-RNTI.

Optionally, when the first RAR and the second RAR are carried on a first PDSCH, a media access control protocol data unit MAC PDU carried on the first PDSCH includes a first sub protocol data unit subPDU, the first subPDU includes third information, and the third information indicates whether the first subPDU includes the first RAR.

Figure 11:
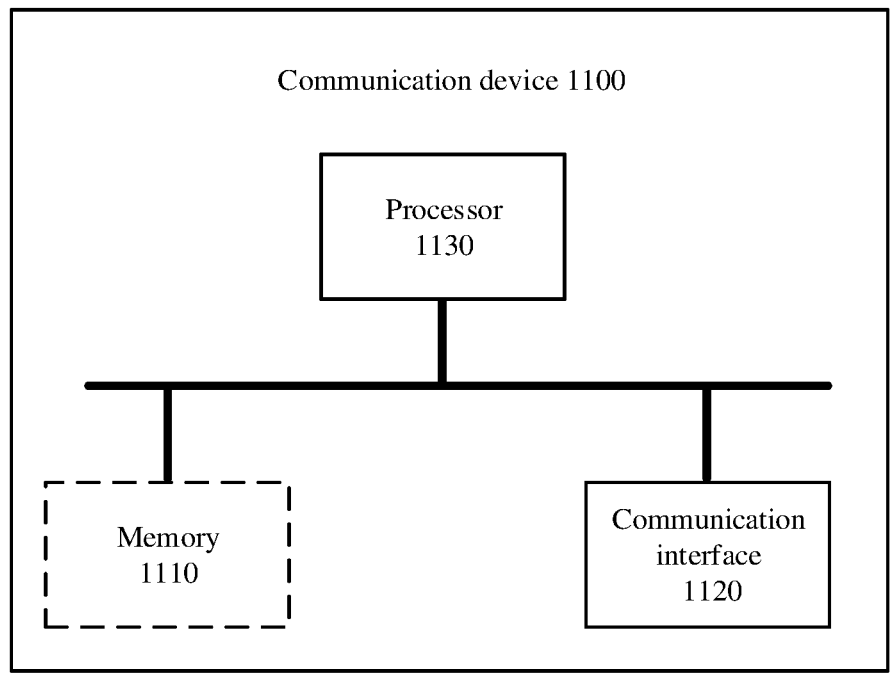
FIG. 11 is a schematic block diagram of a communication device according to an embodiment of this application.

An embodiment of this application provides a communication device 1100. FIG. 11 is a schematic block diagram of the communication device according to an embodiment of this application.

The network device 1100 includes a memory 1110, a communication interface 1120, and a processor 1130.

The memory 1110 is configured to store executable instructions.

The processor 1130 is coupled to the memory by using the communication interface. The processor 1130 is configured to invoke and run the executable instructions in the memory 1110, to implement the method in embodiments of this application.

The foregoing processor may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The foregoing memory may be a volatile memory or a non-volatile memory, or may include both a volatile memory and a non-volatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and the volatile memory may be used as an external cache. Through example but not limitative descriptions, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be understood that the memory may be integrated into the processor, the processor and the memory may be integrated into a same chip, or the processor and the memory may be separately located on different chips and connected in an interface coupling manner. This is not limited in this embodiment of this application.

An embodiment of this application further provides a computer-readable storage medium. The computer-readable storage medium stores computer instructions used to implement the method in the foregoing method embodiments. When the computer program is run on a computer, the computer is enabled to implement the method in the foregoing method embodiments.

In addition, the term "and/or" in this application merely indicates an association relationship for describing associated objects, and indicates that three relationships may exist. For example, A and/or B may indicate the following three cases: Only A exists, both A and B exist, and only B exists. In addition, the character "/" in this specification generally indicates that the associated objects are in an "or" relationship. In this application, the term "at least one" may represent "one" and "two or more". For example, at least one of A, B, and C may represent the following seven cases: Only A exists, only B exists, only C exists, both A and B exist, both A and C exist, both C and B exist, A, B, and C all exist.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each specific application, but such implementation should not be considered beyond the scope of this application.

A person skilled in the art may clearly learn that, for the purpose of convenient and brief description, for a specific working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the described apparatus embodiments are merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by a first terminal device, a first physical random access resource, wherein the first terminal device is a first-type terminal device;
   sending, by the first terminal device, a first random access request message on the first physical random access resource;
   performing, by the first terminal device, at least one of:
      before receiving first downlink control information (DCI), receiving, by the first terminal device, first indication information, wherein the first indication information indicates whether the first DCI and second DCI received by a second terminal device are carried on a same physical downlink control channel (PDCCH); or
      before receiving a first random access response (RAR), receiving, by the first terminal device, second indication information, wherein the second indication information indicates whether the first RAR and a second RAR scheduled by the second DCI are carried on a same physical downlink shared channel (PDSCH);
   receiving, by the first terminal device, the first DCI, wherein the first DCI schedules the first RAR; and
   receiving, by the first terminal device, the first RAR based on the first DCI; and
   wherein the first DCI received by the first terminal device and the second DCI received by the second terminal device are carried on the same PDCCH, or the first RAR scheduled by the first DCI and the second RAR scheduled by the second DCI are carried on the same PDSCH;
   wherein the second terminal device is a second-type terminal device; and
   wherein first-type terminal devices have a reduced capability compared to second-type terminal devices, or second-type terminal devices have a reduced capability compared to first-type terminal devices.

2. The method according to claim 1, wherein the first physical random access resource is not the same as a second physical random access resource used by the second terminal device to send a second random access request message.

3. The method according to claim 1, wherein receiving, by the first terminal device, the first DCI comprises:
   the first DCI and the second DCI that are carried on different PDCCHs, and the first terminal device determines a first random access radio network temporary identifier (RA-RNTI) based on the first physical random access resource, and receives the first DCI based on the first RA-RNTI; or
   the first DCI and the second DCI are carried on a same PDCCH, and the first terminal device determines a second RA-RNTI based on a second physical random access resource, and receives the first DCI based on the second RA-RNTI.

4. The method according to claim 1, wherein receiving, by the first terminal device, the first RAR based on the first DCI comprises:
   when the first RAR and the second RAR are carried on a first PDSCH, a media access control protocol data unit (MAC PDU) carried on the first PDSCH comprises a first sub protocol data unit (subPDU), the first subPDU comprises third information, and the third information indicates whether the first subPDU comprises the first RAR.

5. The method according to claim 1, wherein whether the first DCI received by the first terminal device and the second DCI received by the second terminal device are carried on the same PDCCH or the first RAR scheduled by the first DCI and the second RAR scheduled by the second DCI are carried on the same PDSCH are determined based on a first capability parameter of the first terminal device and a second capability parameter of the second terminal device.

6. The method according to claim 1, wherein the first indication information or the second indication information is transmitted in at least one of: radio resource control (RRC) signaling, medium access control (MAC) signaling, a system information block (SIB), or a broadcast message.

7. A method, comprising:
performing, by a network device, at least one of:
- before sending first downlink control information (DCI) to a first terminal device, sending, by the network device, first indication information to the first terminal device, wherein the first indication information indicates whether the first DCI and second DCI sent to a second terminal device are carried on a same physical downlink control channel (PDCCH); or
- before sending a first random access response (RAR), sending, by the network device, second indication information to the first terminal device, wherein the second indication information indicates whether the first RAR and a second RAR scheduled by the second DCI are carried on a same physical downlink shared channel (PDSCH);

sending, by the network device, the first DCI to the first terminal device, and sending the second DCI to the second terminal device, wherein the first DCI schedules the first RAR, the second DCI schedules the second RAR, the first terminal device is a first-type terminal device, and the second terminal device is a second-type terminal device; and sending, by the network device, the first RAR to the first terminal device, and sending the second RAR to the second terminal device; and wherein the first DCI and the second DCI are carried on the same PDCCH, or the first RAR and the second RAR are carried on the same PDSCH; and wherein first-type terminal devices have a reduced capability compared to second-type terminal devices, or second-type terminal devices have a reduced capability compared to first-type terminal devices.

8. The method according to claim 7, wherein sending, by the network device, the first DCI to the first terminal device comprises:
- the first DCI and the second DCI are carried on different PDCCHs, and the network device determines a first random access radio network temporary identifier (RA-RNTI) based on a first physical random access resource, and sends the first DCI by using the first RA-RNTI, wherein the first physical random access resource is allocated by the network device to the first terminal device; or
- the first DCI and the second DCI are carried on a same PDCCH, and the network device determines a second RA-RNTI based on a second physical random access resource, and sends the first DCI by using the second RA-RNTI, wherein the second physical random access resource is allocated by the network device to the second terminal device.

9. An apparatus, comprising:
one or more processors; and
a non-transitory computer-readable storage medium storing a program that is executed by the one or more processors, the program including instructions to:
determine a first physical random access resource;
send a first random access request message on the first physical random access resource;
perform at least one of:
- before receiving first downlink control information (DCI), receive first indication information, wherein the first indication information indicates whether the first DCI and second DCI received by a second terminal device are carried on a same physical downlink control channel (PDCCH); or
- before receiving a first random access response (RAR), receive second indication information, wherein the second indication information indicates whether the first RAR and a second RAR scheduled by the second DCI are carried on a same physical downlink shared channel (PDSCH);

receive the first DCI, wherein the first DCI schedules the first RAR; and
receive the first RAR based on the first DCI; and
wherein the first DCI received by the apparatus and the second DCI received by the second terminal device are carried on the same PDCCH, or the first RAR scheduled by the first DCI and the second RAR scheduled by the second DCI are carried on the same PDSCH;
wherein the second terminal device is a second-type terminal device; and
wherein first-type terminal devices have a reduced capability compared to second-type terminal devices, or second-type terminal devices have a reduced capability compared to first-type terminal devices.

10. The apparatus according to claim 9, wherein the first physical random access resource is not the same as a second physical random access resource used by the second terminal device to send a second random access request message.

11. The apparatus according to claim 10, wherein the program further includes instructions to:
- when the first DCI and the second DCI are carried on different PDCCHs, determine a first random access radio network temporary identifier (RA-RNTI) based on the first physical random access resource, and receive the first DCI based on the first RA-RNTI; or
- when the first DCI and the second DCI are carried on a same PDCCH, determine a second RA-RNTI based on the second physical random access resource, and receive the first DCI based on the second RA-RNTI.

12. An apparatus, comprising:
one or more processors; and
a non-transitory computer-readable storage medium storing a program that is executable by the one or more processors, the program including instructions to:
perform at least one of:
- before sending first downlink control information (DCI), send first indication information to a first terminal device, wherein the first indication information indicates whether the first DCI and second DCI sent to a second terminal device are carried on a same physical downlink control channel (PDCCH); or
- before sending a first random access response (RAR), send second indication information to the first terminal device, wherein the second indication information indicates whether the first RAR and a second RAR scheduled by the second DCI are carried on a same physical downlink shared channel (PDSCH);

send the first DCI to the first terminal device, and send the second DCI to the second terminal device, wherein the first DCI schedules the first RAR, the second DCI schedules the second RAR, the first terminal device is a first-type terminal device, and the second terminal device is a second-type terminal device; and
send the first RAR to the first terminal device, and send the second RAR to the second terminal device; and
wherein the first DCI and the second DCI are carried on the same PDCCH, or the first RAR and the second RAR are carried on the same PDSCH; and
wherein first-type terminal devices have a reduced capability compared to second-type terminal devices, or second-type terminal devices have a reduced capability compared to first-type terminal devices.

13. The apparatus according to claim 12, wherein the first DCI and the second DCI are carried on different PDCCHs, the program further including instructions to: determine a first random access radio network temporary identifier RA-RNTI based on a first physical random access resource, wherein the first physical random access resource is allocated to the first terminal device;
  send the first DCI by using the first RA-RNTI;
  the first DCI and the second DCI are carried on a same PDCCH, and determine a second RA-RNTI based on a second physical random access resource, wherein the second physical random access resource is allocated to the second terminal device; and
  send the first DCI by using the second RA-RNTI.

* * * * *